(12) United States Patent
Fedeyko et al.

(10) Patent No.: US 9,114,376 B2
(45) Date of Patent: Aug. 25, 2015

(54) PLATINUM GROUP METAL (PGM) CATALYST FOR TREATING EXHAUST GAS

(75) Inventors: Joseph Michael Fedeyko, Glen Mills, PA (US); Hai-Ying Chen, Conshohocken, PA (US); Paul Joseph Andersen, Plymouth Meeting, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/124,075

(22) PCT Filed: Jun. 5, 2012

(86) PCT No.: PCT/US2012/040909
§ 371 (c)(1),
(2), (4) Date: Mar. 3, 2014

(87) PCT Pub. No.: WO2012/170421
PCT Pub. Date: Dec. 13, 2012

(65) Prior Publication Data
US 2014/0170045 A1   Jun. 19, 2014

Related U.S. Application Data

(60) Provisional application No. 61/493,465, filed on Jun. 5, 2011.

(51) Int. Cl.
*B01D 53/94* (2006.01)
*B01J 29/00* (2006.01)
(Continued)

(52) U.S. Cl.
CPC ............ *B01J 29/068* (2013.01); *B01D 53/56* (2013.01); *B01D 53/58* (2013.01); *B01D 53/62* (2013.01); *B01D 53/9418* (2013.01); *B01J 29/7015* (2013.01); *B01J 29/74* (2013.01); *B01J 29/743* (2013.01); *B01J 29/85* (2013.01); *B01J 29/87* (2013.01); *B01J 35/0006* (2013.01); *B01J 35/023* (2013.01); *B01J 35/04* (2013.01); *B01J 35/06* (2013.01); *B01J 37/0246* (2013.01); *B01D 53/9477* (2013.01); *B01D 2255/1021* (2013.01);
(Continued)

(58) Field of Classification Search
CPC ............. B01D 53/94; B01J 29/00; F01N 3/28
USPC ........... 423/213.2, 213.5, 213.7; 60/274, 299, 60/301; 502/74, 64, 66, 325, 339
See application file for complete search history.

(56) References Cited

U.S. PATENT DOCUMENTS 4,544,538 A    10/1985   Zones
4,582,650 A *   4/1986   Felthouse .................. 562/17
(Continued)

FOREIGN PATENT DOCUMENTS

GB        2475740 A     6/2011

OTHER PUBLICATIONS

Chen, H., et al., "Contribution of Hydrogen Spillover to the Hydrogenation of Naphthalene Over Diluted Pt/RHO Catalysts," Applied Catalysis A: General, Elsevier Science, vol. 358, No. 2, May 1, 2009, pp. 103-109.
(Continued)

*Primary Examiner* — Timothy Vanoy
(74) *Attorney, Agent, or Firm* — Jimmie D. Johnson, Jr.

(57) ABSTRACT

Provided are catalysts comprising a small pore molecular sieve embedded with platinum group metal (PGM) and methods for treating lean burn exhaust gas using the same.

26 Claims, 2 Drawing Sheets

(51) Int. Cl.

| | |
|---|---|
| *F01N 3/28* | (2006.01) |
| *B01J 29/068* | (2006.01) |
| *B01J 29/74* | (2006.01) |
| *B01J 37/02* | (2006.01) |
| *B01J 35/00* | (2006.01) |
| *B01J 29/85* | (2006.01) |
| *B01J 29/87* | (2006.01) |
| *B01J 35/02* | (2006.01) |
| *B01J 35/04* | (2006.01) |
| *B01J 35/06* | (2006.01) |
| *B01D 53/56* | (2006.01) |
| *B01D 53/58* | (2006.01) |
| *B01D 53/62* | (2006.01) |
| *B01J 29/70* | (2006.01) |
| *B01J 23/40* | (2006.01) |
| *B01J 29/78* | (2006.01) |

(52) U.S. Cl.
CPC ..... *B01D 2255/50* (2013.01); *B01D 2255/9155* (2013.01); *B01J 23/40* (2013.01); *B01J 29/78* (2013.01); *B01J 29/783* (2013.01); *B01J 2229/183* (2013.01); *B01J 2229/186* (2013.01); *B01J 2229/42* (2013.01); *Y02C 20/10* (2013.01)

(56) References Cited

U.S. PATENT DOCUMENTS

| | | | | |
|---|---|---|---|---|
| 4,724,275 | A | * | 2/1988 | Hinnenkamp et al. ........ 585/733 |
| 5,391,533 | A | * | 2/1995 | Peterson et al. .............. 502/262 |
| 6,063,351 | A | * | 5/2000 | Hamon et al. ............. 423/239.2 |
| 2001/0053340 | A1 | * | 12/2001 | Noda et al. ................. 423/213.2 |
| 2010/0111791 | A1 | | 5/2010 | Caudle |

OTHER PUBLICATIONS

Weitkamp, J. et al., "Introduction of Noble Metals Into Small Pore Zeolites Via Solid State Ion Exchange," Studies in Surface Science and Catalysis, Elsevier B.V., vol. 94, Jan. 1, 1995, pp. 278-285.
Yang, H. et al., "Incorporating Platinum Precursors into a NaA-Zeolite Synthesis Mixture Promoting the Formation of Nanosized Zeolite," Elsevier Science Publishing, vol. 117, Jan. 1, 2009, No. 102.
Altwasser et al., "Ruthenium-Containing Small-Pore Zeolites for Shape-Selective Catalysis," Microporous and Mesoporous Materials, Elsevier Science Publishing, vol. 104, No. 1-3, Jul. 31, 2007, pp. 281-288.
Weisz, P.B. et al., "Catalysis by Crystalline Aluminosilicates II. Molecular-Shape Selective Reactions," Journal of Catalysis, vol. 1, (1962) pp. 307-312.
Kecht, Johann, et al., "Exceptionally Small Colloidal Zeolites Templated by Pd and Pt Amines," Langmuir, vol. 24, No. 8, Apr. 1, 2008, pp. 4310-4315.

* cited by examiner

PLATINUM GROUP METAL (PGM) CATALYST FOR TREATING EXHAUST GAS

BACKGROUND

A.) Field of Use

The present invention relates to catalysts, systems, and methods that are useful for treating an exhaust gas which occurs as a result of combustion of hydrocarbon fuel, such as an exhaust gas produced by diesel engines.

B.) Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a vehicular exhaust gas is $NO_x$, which includes nitric oxide (NO), nitrogen dioxide ($NO_2$), and/or nitrous oxide ($N_2O$). The reduction of $NO_x$ to $N_2$ in a lean burn exhaust gas, such as that created by diesel engines, is particularly problematic because the exhaust gas contains enough oxygen to favor oxidative reactions instead of reduction. $NO_x$ can be reduced in a diesel exhaust gas, however, by a heterogenic catalysis process commonly known as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

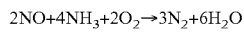

$$2NO + 4NH_3 + 2O_2 \rightarrow 3N_2 + 6H_2O$$

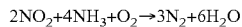

$$2NO_2 + 4NH_3 + O_2 \rightarrow 3N_2 + 6H_2O$$

$$NO + NO_2 + 2NH_3 \rightarrow 2N_2 + 3H_2O$$

Platinum Group Metal (PGM)-based reduction catalysts have been reported since the mid-1970's (Bosch, Catalysis Today, 1988, pg. 369) to exhibit excellent $NO_x$ reduction activity at low temperatures. These catalysts, however, have very poor selectivity for $N_2$, typically less than 50%. (Buenos Lopez, et al., Applied Catalysis B, 2005, pg. 1). At low temperatures, e.g. about 150° C. to about 250° C., the low selectivity for $N_2$ correlates with the formation of significant amounts of $N_2O$; while at high temperatures, e.g. greater than about 350° C., the low selectivity correlates to the oxidation of $NH_3$ (the desired reductant) to $NO_x$.

Another common problem with $NO_x$ reduction systems utilizing an $NH_3$ reductant is the release of unreacted ammonia, also referred to as "ammonia slip". Slip can occur when catalyst temperatures are not in the optimal range for the reaction or when too much ammonia is injected into the process. An additional oxidation catalyst is typically fitted downstream of an SCR system to reduce such slip. This catalyst typically contains a PGM component either in single catalyst configuration where the catalyst acts solely as an oxidation catalyst or in a dual catalyst configuration where zoning or layering of the catalyst allows for both oxidative and reductive functionality.

PGM purportedly has been incorporated into MCM-41, a mesoporous zeolite having a pore size between 20-30 Angstroms by incipient wetness for hydrocarbon SCR. Due to the large pore size, no shape selectivity for these catalysts has been observed. Park et al. studied this phenomenon, and concluded that if Pt was incorporated into the pores of ZSM-5, and 10-ring, medium pore size zeolite, by a typical incipient wetness method, then some selectivity, e.g., conversion of $NO_x$ and $N_2$ yield would be expected. However, the catalysts made by this method show the same conversion of $NO_x$ and $N_2$ yield. Therefore, typical incipient wetness methods are not capable of achieving high PGM exchange or incorporate onto the walls of the molecular sieve crystal structure or into the walls by filling void space within the crystal structure itself. (Park et al, From Zeolites to Porous MOF materials—the 40th Anniversary of International Zeolite Conference, 2007).

These drawbacks of conventional PGM-based catalysts limit their practical application. There is, therefore a continuing unmet need for PGM based molecular sieve catalysts that can provide for high $NO_x$ reduction efficiency at low temperatures, high $N_2$ selectivity, and reduced $NH_3$ slip.

SUMMARY

Applicants have unexpectedly discovered that incorporating PGM into the porous network of a small pore molecular sieves achieves particularly good selectivity for $N_2$ during a selective catalytic reduction of $NO_x$ in a lean burn exhaust gas at temperatures of about 150° C. to about 300° C., especially including temperatures of about 150° C. to about 250° C. This result is surprising in view of the finding that the poor selectivity of PGM based $NO_x$ reduction catalysts is related to the inherent activity of the PGM species regardless of the support material, e.g. $Al_2O_3$, silica, molecular sieves. Conventional loading techniques, such as impregnation or solution ion-exchange, are well suited for embedding base metals into support materials. But PGMs cannot be incorporated into molecular sieves through the same processes without a significant amount of the metal depositing on the molecular sieve surface and not within the pores. It is believed that this surface PGM promotes $N_2O$ formation and thus reduced selectivity for $N_2$. For example, the yield for $N_2$ in standard small pore molecular sieves with surface PGMs at temperatures from 150 to 250° C. is well below 50%. In contrast to conventional PGM catalysts, applicants have found that molecular sieves embedded with PGMs using techniques such as those described herein, i.e., a majority of the PGM is incorporated into the pore network of the molecular sieve, the resulting catalyst achieves much higher selectivity for $N_2$. In the present invention, the $N_2$ selectivity of the PGM embedded catalyst is greater than 50%, and can be greater than 90%, and even greater than about 98%.

Moreover, the present catalysts also achieve particularly good ammonia oxidation at temperatures above 350° C. Thus, the catalyst can serve the dual role of low temperature $NO_x$ reduction and high temperature ammonia oxidation. This dual functionality is particularly valuable in exhaust systems that also contain an upstream conventional SCR catalyst, which typically have a light-off temperature of at least 250° C. In such systems, the PGM catalyst of the present invention serves as an SCR during relatively cold conditions, such as engine start-up; and after the exhaust system heats-up, the PGM catalyst changes functionality to serve as an ammonia slip catalyst. Very high $NO_x$ conversion and high $N_2$ selectivity at temperatures below 200° C. and very high NH₃ oxidation at high temperatures is a rare combination of features for a single catalyst and is not present in other known exhaust gas treatment catalysts.

Accordingly, provided is a catalyst comprising (a) a small pore aluminosilicate molecular sieve material comprising a plurality of crystals having a surface and a porous network; and (b) at least one Platinum Group Metal (PGM), wherein a majority amount of said PGM is embedded in said porous network relative to PGM disposed on said surface. (Such catalyst, with or without other features described herein, are also referred to as "PGM catalyst".)

According to another aspect of the invention, provided is catalyst article comprising the PGM catalyst disposed on a substrate, such as a wall-flow or flow through honeycomb monolith, preferably as a washcoat.

According to another aspect of the invention, provided is a method for treating emissions comprising (a) contacting a lean burn exhaust stream containing $NO_x$ and ammonia with a PGM catalyst at a temperature of about 150° C. to about 650° C.; and (b) reducing at least a portion of said $NO_x$ to $N_2$ and $H_2O$ at a temperature of about 150° C. to about 300° C. and oxidizing at least a portion of said ammonia at a temperature of about 250° C. to about 650° C.

According to another aspect of the invention, provided is a method for treating emissions comprising (a) contacting a lean burn exhaust stream containing CO and NO with a PGM catalyst; and (b) oxidizing at least one of said CO and NO to form $CO_2$ and $NO_2$, respectively, wherein said oxidizing NO to $NO_2$ results in an exhaust gas stream having an $NO:NO_2$ ratio of from about 4:1 to about 1:3 by volume.

According to yet another aspect of the invention, provided is a system for treating exhaust gas comprising (a) a reductant source; (b) an upstream SCR catalyst; and (c) a downstream PGM catalyst; wherein said reductant source, upstream SCR catalyst, and downstream catalyst are in fluid communication with each other and are arranged so that an exhaust gas stream flowing through the system contacts the reductant source prior to the upstream SCR catalyst and contacts the SCR catalyst prior to the downstream PGM catalyst.

DETAILED DESCRIPTION OF PREFERRED EMBODIMENTS OF THE INVENTION

Figure 1:
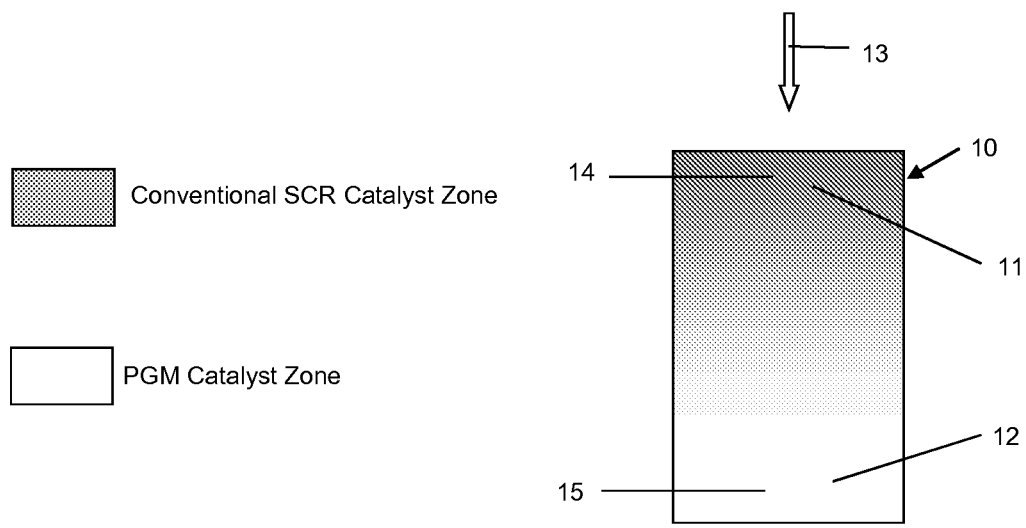
FIG. 1 is a diagram of a catalyst article according to an embodiment of the present invention.

In a preferred embodiment, the invention is directed to a catalyst for improving environmental air quality, particularly for improving exhaust gas emissions generated by diesel and other lean burn engines. Exhaust gas emissions are improved, at least in part, by reducing $NO_x$ and/or $NH_3$ slip concentrations in lean burn exhaust gas over a broad operational temperature range. Useful catalysts are those that selectively reduce $NO_x$ and/or oxidize ammonia in an oxidative environment (i.e., an SCR catalyst and/or AMOX catalyst). The catalyst is also useful in oxidizing other exhaust system components such as CO and NO.

According to a preferred embodiment, provided is a catalyst composition comprising a small pore molecular sieve material embedded with PGM.

"PGM embedded" as used herein means PGM within at least a portion of the pore network of a molecular sieve, including PGM on the surface of the interior walls of the pore network, in the crystalline framework, and/or within pore voids (e.g., crystalline cages), for example when the molecular sieve is formed. PGM occupying void space within the structural framework of the crystal can be formed in situ during the synthesis of the molecular sieve. Examples include direct incorporation of PGM into the pores of the molecular sieves during synthesis (Kecht, et al., Langmuir, 2008, pg. 4310; Chen, et al., Applied Catalyst A: General 358, 2009, pp. 103-09), the disclosures of each is incorporated by reference herein. In a particular example, platinum can be incorporated into a small pore molecular sieve, such as RHO, during synthesis by adding a source of platinum, such as bis(enthylenediamine)platinum (II) chloride, to a sol gel precursor of the small pore aluminosilicate molecular sieve. In another example, a source of PGM, such as platinum nitrate or palladium nitrate, can be used to create a PGM-tetraethylenepentamine (TEPA) complex, which in turn can be used to synthesize small pore aluminosilicate molecular sieve having a CHA framework.

PGM within the network also can be achieved by certain non-solution ion exchange or isomorphous substitution. One such technique is solid state ion exchange of PGM into the pore of the molecular sieve (Quinones, et al., Materials Letters, 2009, pg. 2684), which is incorporated by reference herein. PGM residing on the surface of the pore network typically from via weakly associated bonds between the PGM and the surface within the pore (e.g., at acid sites).

A combination of in situ synthesis and exchange/substitution techniques can be used to increase the amount of PGM embedded molecular sieve catalyst.

"Molecular sieves" as used herein means a material having a pore network with one or more uniform pore sizes which results from the material's crystalline or quasi-crystalline framework, and includes aluminosilicates such as zeolites, silicoaluminophosphates, aluminophosphates, and combinations thereof as mixed-phase materials. A molecular sieve framework is defined in terms of the geometric arrangement of its primary tetrahedral atoms "T-atoms" (e.g., Al and Si). Each T-atom in the framework is connected to neighboring T-atoms through oxygen bridges and these or similar connections are repeated to form a crystalline structure. Codes for specific framework types are assigned to established structures that satisfy the rules of the IZA Structure Commission. The interconnection of tetrahedral species form internal cell walls that, in turn, define void pore volumes. The molecularly porous frameworks have volumes on the order of a few cubic nanometers and cell openings (also referred to as "pores" or "apertures") on the order of a few angstroms in diameter. The pores are aligned within the framework to create one or more channels which extend through the framework (pore network), thus creating a mechanism to restrict the ingress or passage of different molecular or ionic species through the molecular sieve, based on the relative sizes of the channels and molecular or ionic species.

The size and shape of molecular sieves affect their catalytic activity in part because they exert a steric influence on the reactants, controlling the access of reactants and products. For example, small molecules, such as $NO_x$, can typically pass into and out of the cells and/or can diffuse through the channels of a small-pore molecular sieve (i.e., those having framework with a maximum ring size of eight tetrahedral atoms), whereas larger molecules, such as long chain hydrocarbons, cannot. Moreover, partial or total dehydration of a molecular sieve can results in a crystal structure interlaced with channels of molecular dimensions.

The cell openings can be defined by their ring size, where, for example, the term "8-ring" refers to a closed loop that is built from 8 tetrahedrally coordinated silicon (or aluminum) atoms and 8 oxygen atoms. Molecular sieves having a small pore framework, i.e., containing a maximum ring size of 8, have been found to be particularly useful in SCR applications. In one embodiment, the small pore molecular sieve is selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON.

Illustrative examples of suitable small pore molecular sieves are set out in Table 1.

TABLE 1

Small pore molecular sieves with application in the present invention

| Framework Type (by Framework Type Code) | Type material and illustrative isotypic framework structures |
|---|---|
| ACO | ACP-1 |
| AEI | AlPO-18 |
|  | [Co—Al—P—O]-AEI |
|  | SAPO-18 |
|  | SIZ-8 |
|  | SSZ-39 |
| AEN | AlPO-EN3 |
|  | AlPO-53(A) |
|  | AlPO-53(B) |
|  | [Ga—P—O]-AEN |
|  | CFSAPO-1A |
|  | CoIST-2 |
|  | IST-2 |
|  | JDF-2 |
|  | MCS-1 |
|  | MnAPO-14 |
|  | Mu-10 |
|  | UiO-12-500 |
|  | UiO-12-as |
| AFN | AlPO-14 |
|  | |($C_3N_2H_{12}$)—|[Mn—Al—P—O]-AFN |
|  | GaPO-14 |
| AFT | AlPO-52 |
| AFX | SAPO-56 |
|  | MAPSO-56, M = Co, Mn, Zr |
|  | SSZ-16 |
| ANA | Analcime |
|  | AlPO$_4$-pollucite |
|  | AlPO-24 |
|  | Ammonioleucite |
|  | [Al—Co—P—O]-ANA |
|  | [Al—Si—P—O]-ANA |
|  | |Cs—|[Al—Ge—O]-ANA |
|  | |Cs—|[Be—Si—O]-ANA |
|  | |Cs$_{16}$|[Cu$_8$Si$_{40}$O$_{96}$]-ANA |
|  | |Cs—Fe|[Si—O]-ANA |
|  | |Cs—Na—(H$_2$O)|[Ga—Si—O]-ANA |
|  | [Ga—Ge—O]-ANA |
|  | |K—|[B—Si—O]-ANA |
|  | |K—|[Be—B—P—O]-ANA |
|  | |Li—|[Li—Zn—Si—O]-ANA |
|  | |Li—Na|[Al—Si—O]-ANA |

TABLE 1-continued

Small pore molecular sieves with application in the present invention

| Framework Type (by Framework Type Code) | Type material and illustrative isotypic framework structures |
|---|---|
|  | |Na—|[Be—B—P—O]-ANA |
|  | |(NH$_4$)—|[Be—B—P—O]-ANA |
|  | |(NH$_4$)—|[Zn—Ga—P—O]-ANA |
|  | [Zn—As—O]-ANA |
|  | Ca-D |
|  | Hsianghualite |
|  | Leucite |
|  | Na—B |
|  | Pollucite |
|  | Wairakite |
| APC | AlPO—C |
|  | AlPO—H3 |
|  | CoAPO-H3 |
| APD | AlPO-D |
|  | APO-CJ3 |
| ATT | AlPO-12-TAMU |
|  | AlPO-33 |
|  | RMA-3 |
| CDO | CDS-1 |
|  | MCM-65 |
|  | UZM-25 |
| CHA | Chabazite |
|  | AlPO-34 |
|  | [Al—As—O]-CHA |
|  | [Al—Co—P—O]-CHA |
|  | |Co| [Be—P—O]-CHA |
|  | |Co$_3$(C$_6$N$_4$H$_{24}$)$_3$(H$_2$O)$_9$| |
|  | [Be$_{18}$P$_{18}$O$_{72}$]-CHA |
|  | [Co—Al—P—O]-CHA |
|  | |Li—Na| [Al—Si—O]-CHA |
|  | [Mg—Al—P—O]-CHA |
|  | [Si—O]-CHA |
|  | [Zn—Al—P—O]-CHA |
|  | [Zn—As—O]-CHA |
|  | CoAPO-44 |
|  | CoAPO-47 |
|  | DAF-5 |
|  | GaPO-34 |
|  | K-Chabazite |
|  | Linde D |
|  | Linde R |
|  | LZ-218 |
|  | MeAPO-47 |
|  | MeAPSO-47 |
|  | (Ni(deta)$_2$)-UT-6 |
|  | Phi |
|  | SAPO-34 |
|  | SAPO-47 |
|  | SSZ-13 |
|  | UiO-21 |
|  | Willhendersonite |
|  | ZK-14 |
|  | ZYT-6 |
| DDR | Deca-dodecasil 3R |
|  | [B—Si—O]-DDR |
|  | Sigma-1 |
|  | ZSM-58 |
| DFT | DAF-2 |
|  | ACP-3, [Co—Al—P—O]-DFT |
|  | [Fe—Zn—P—O]-DFT |
|  | [Zn—Co—P—O]-DFT |
|  | UCSB-3GaGe |
|  | UCSB-3ZnAs |
|  | UiO-20, [Mg—P—O]-DFT |
| EAB | TMA-E |
|  | Bellbergite |
| EDI | Edingtonite |
|  | |($C_3H_{12}N_2$)$_{2.5}$| [Zn$_5$P$_5$O$_{20}$]-EDI |
|  | [Co—Al—P—O]-EDI |
|  | [Co—Ga—P—O]-EDI |
|  | |Li—|[Al—Si—O]-EDI |
|  | |Rb$_7$Na(H$_2$O)$_3$| |
|  | [Ga$_8$Si$_{12}$O$_{40}$]-EDI |

TABLE 1-continued

Small pore molecular sieves with application in the present invention

| Framework Type (by Framework Type Code) | Type material and illustrative isotypic framework structures |
|---|---|
|  | [Zn—As—O]-EDI |
|  | K—F |
|  | Linde F |
|  | Zeolite N |
| EPI | Epistilbite |
| ERI | Erionite |
|  | AlPO-17 |
|  | Linde T |
|  | LZ-220 |
|  | SAPO-17 |
|  | ZSM-34 |
| GIS | Gismondine |
|  | Amicite |
|  | [Al—Co—P—O]-GIS |
|  | [Al—Ge—O]-GIS |
|  | [Al—P—O]-GIS |
|  | [Be—P—O]-GIS |
|  | \|(C$_3$H$_{12}$N$_2$)$_4$\| [Be$_8$P$_8$O$_{32}$]-GIS |
|  | \|(C$_3$H$_{12}$N$_2$)$_4$\| [Zn$_8$P$_8$O$_{32}$]-GIS |
|  | [Co—Al—P—O]-GIS |
|  | [Co—Ga—P—O]-GIS |
|  | [Co—P—O]-GIS |
|  | \|Cs$_4$\|[Zn$_4$B$_4$P$_8$O$_{32}$]-GIS |
|  | [Ga—Si—O]-GIS |
|  | [Mg—Al—P—O]-GIS |
|  | \|(NH$_4$)$_4$\|[Zn$_4$B$_4$P$_8$O$_{32}$]-GIS |
|  | \|Rb$_4$\|[Zn$_4$B$_4$P$_8$O$_{32}$]-GIS |
|  | [Zn—Al—As—O]-GIS |
|  | [Zn—Co—B—P—O]-GIS |
|  | [Zn—Ga—As—O]-GIS |
|  | [Zn—Ga—P—O]-GIS |
|  | Garronite |
|  | Gobbinsite |
|  | MAPO-43 |
|  | MAPSO-43 |
|  | Na-P1 |
|  | Na-P2 |
|  | SAPO-43 |
|  | TMA-gismondine |
| GOO | Goosecreekite |
| IHW | ITQ-32 |
| ITE | ITQ-3 |
|  | Mu-14 |
|  | SSZ-36 |
| ITW | ITQ-12 |
| LEV | Levyne |
|  | AlPO-35 |
|  | CoDAF-4 |
|  | LZ-132 |
|  | NU-3 |
|  | RUB-1 [B—Si—O]-LEV |
|  | SAPO-35 |
|  | ZK-20 |
|  | ZnAPO-35 |
| KFI | ZK-5 |
|  | \|18-crown-6\|[Al—Si—O]-KFI |
|  | [Zn—Ga—As—O]-KFI |
|  | (Cs,K)-ZK-5 |
|  | P |
|  | Q |
| MER | Merlinoite |
|  | [Al—Co—P—O]-MER |
|  | \|Ba\|[Al—Si—O]-MER |
|  | \|Ba—Cl\|[Al—Si—O]-MER |
|  | [Ga—Al—Si—O]-MER |
|  | \|K\|[Al—Si—O]-MER |
|  | \|NH$_4$\|[Be—P—O]-MER |
|  | K-M |
|  | Linde W |
|  | Zeolite W |
| MON | Montesommaite |
|  | [Al—Ge—O]-MON |

TABLE 1-continued

Small pore molecular sieves with application in the present invention

| Framework Type (by Framework Type Code) | Type material and illustrative isotypic framework structures |
|---|---|
| NSI | Nu-6(2) |
|  | EU-20 |
| OWE | UiO-28 |
|  | ACP-2 |
| PAU | Paulingite |
|  | [Ga—Si—O]-PAU |
|  | ECR-18 |
| PHI | Phillipsite |
|  | [Al—Co—P—O]-PHI |
|  | DAF-8 |
|  | Harmotome |
|  | Wellsite |
|  | ZK-19 |
| RHO | Rho |
|  | [Be—As—O]-RHO |
|  | [Be—P—O]-RHO |
|  | [Co—Al—P—O]-RHO |
|  | \|H—\|[Al—Si—O]-RHO |
|  | [Mg—Al—P—O]-RHO |
|  | [Mn—Al—P—O]-RHO |
|  | \|Na$_{16}$Cs$_8$\|Al$_{24}$Ge$_{24}$O$_{96}$\|-RHO |
|  | \|NH$_4$—\|[Al—Si—O]-RHO |
|  | \|Rb—\|[Be—As—O]-RHO |
|  | Gallosilicate ECR-10 |
|  | LZ-214 |
|  | Pahasapaite |
| RTH | RUB-13 |
|  | SSZ-36 |
|  | SSZ-50 |
| SAT | STA-2 |
| SAV | Mg-STA-7 |
|  | Co-STA-7 |
|  | Zn-STA-7 |
| SBN | UCSB-9 |
|  | SU-46 |
| SIV | SIZ-7 |
| THO | Thomsonite |
|  | [Al—Co—P—O]-THO |
|  | [Ga—Co—P—O]-THO |
|  | \|Rb$_{20}$\|[Ga$_{20}$Ge$_{20}$O$_{80}$]-THO |
|  | [Zn—Al—As—O]-THO |
|  | [Zn—P—O]-THO |
|  | [Ga—Si—O]-THO) |
|  | [Zn—Co—P—O]-THO |
| TSC | Tschortnerite |
| UEI | Mu-18 |
| UFI | UZM-5 |
| VNI | VPI-9 |
| YUG | Yugawaralite |
|  | Sr-Q |
| ZON | ZAPO-M1 |
|  | GaPO-DAB-2 |
|  | UiO-7 |

Small pore molecular sieves with particular application for treating NO$_x$ in exhaust gases of lean-burn internal combustion engines, e.g. vehicular exhaust gases, are set out in Table 2.

TABLE 2

Preferred small pore molecular sieves for use in treating exhaust gases of lean-burn internal combustion engines.

| Framework Structure | Representative Material |
|---|---|
| CHA | SAPO-34 |
|  | AlPO-34 |
|  | SSZ-13 |

TABLE 2-continued

Preferred small pore molecular sieves for use in treating exhaust gases of lean-burn internal combustion engines.

| Framework Structure | Representative Material |
|---|---|
| LEV | Levynite |
| | Nu-3 |
| | LZ-132 |
| | SAPO-35 |
| | ZK-20 |
| ERI | Erionite |
| | ZSM-34 |
| | Linde type T |
| DDR | Deca-dodecasil 3R |
| | Sigma-1 |
| KFI | ZK-5 |
| | 18-crown-6 |
| | [Zn—Ga—As—O]-KFI |
| EAB | TMA-E |
| PAU | ECR-18 |
| MER | Merlinoite |
| AEI | SSZ-39 |
| GOO | Goosecreekite |
| YUG | Yugawaralite |
| GIS | P1 |
| VNI | VPI-9 |
| RHO | Rho |

It will be appreciated that such molecular sieves include synthetic crystalline or pseudo-crystalline materials that are isotypes (isomorphs) of one another via their defined framework. For example, specific CHA isotypes that are useful in the present invention include, but are not limited to, DAF-5, LZ-218, Linde D, Linde R, Phi, SAPO-34, SAPO-44, SAPO-47, SSZ-13, SSZ-62, UiO-21, and ZK-14, with SAPO-34 and SSZ-13 being most preferred.

As used herein, the term "SSZ-13" means aluminosilicates described in U.S. Pat. No. 4,544,538 (Zones) as well as any analogs thereof. As used herein, the term "analogs" with respect to a CHA isotype means a molecular sieve having the same topology and essentially the same empirical formula, but are synthesized by a different process and/or have different physical features, such as different distributions of atoms within the CHA framework, different isolations of atomic elements within the molecular sieve (e.g., alumina gradient), different crystalline features, and the like.

Useful aluminosilicates include framework metals other than aluminum, preferably a transition metal or a PGM (also known as metal substituted aluminosilicates). As used herein, the term "metal substituted" with respect to an aluminosilicate framework means the framework has one or more aluminum or silicon framework atoms replaced by the substituted metal. In contrast, the term "metal exchanged" means a molecular sieve having extra-framework metal ions and the term "metal embedded" means extra-framework metal ions within the molecular sieve interior vis-a-vis the exterior surface of the molecular sieve crystal. Metal substituted silico-aluminophosphate (also referred to as MeAPSO) molecular sieves likewise have a framework in which the substituted metal has been inserted.

In preferred embodiments, the molecular sieve material comprises a plurality of molecular sieve crystals having a mean crystal size of greater than about 0.01 μm, preferably between about 0.01 and about 10 μm, such as about 0.1 to about 10 μm, about 0.5 to about 5 μm, about 0.1 to about 1 μm, about 1 to about 5 μm, and about 2 to about 5 μm. The crystals in the catalyst composition can be individual crystals, agglomeration of crystals, or a combination of both. As used herein, the crystal surface means the external surface of the crystal or external surface of an agglomeration of crystals.

Crystal size (also referred to herein as the crystal diameter) is the length of one edge of a face of the crystal. For example, the morphology of chabazite crystals is characterized by rhombohedral (but approximately cubic) faces wherein each edge of the face is approximately the same length. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the molecular sieve powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of a straight edge are measured and recorded. (Particles that are clearly large polycrystalline aggregates should not be included the measurements.) Based on these measurements, the arithmetic mean of the sample crystal sizes is calculated. Other techniques for determining mean particle size or crystal size, such as laser diffraction and scattering can also be used.

The relative amounts of alumina and silica in aluminosilicate molecular sieves can be characterized by a silica-to-alumina mole ratio (SAR). Preferred aluminosilicate molecular sieves have an SAR of about 2 to about 300, such as about 4 to about 200, and about 8 to about 150. In certain embodiments, the aluminosilicate molecular sieve has an SAR of about 10 to about 50, such as from about 10 to about 40, from about 15 to about 30, from about 20 to about 40, from about 10 to about 20, and from about 20 to about 25. In certain other embodiments the aluminosilicate molecular sieve has an SAR of about 5 to about 10. The silica-to-alumina ratio of molecular sieves may be determined by conventional analysis. This ratio is meant to represent, as closely as possible, the ratio in the rigid atomic framework of the molecular sieve crystal and to exclude silicon or aluminum in the binder or, in cationic or other form, within the channels. It will be appreciated that it may be extremely difficult to directly measure the silica-to-alumina ratio of a molecular sieve after it has been combined with a binder material. Accordingly, the silica-to-alumina ratio has been expressed hereinabove in term of the silica-to-alumina ratio of the parent molecular sieve, i.e., the molecular sieve used to prepare the catalyst, as measured prior to the combination of this molecular sieve with the other catalyst components.

The molecular sieves of the present invention preferably have an alkali content of less than 5 weight percent based on the total weight of the molecular sieve. As used here, the alkali content includes the total weight of alkali metals and alkaline earth metals, such as sodium, potassium, calcium, and magnesium, that are present in cationic form in the molecular sieve. In certain embodiments, the alkali content is less than about 3 weight percent, such as less than 2 weight percent, less than 1 weight percent, less than 0.5 weight percent, and less than 0.1 weight percent, based on the total weight of the molecular sieve.

As used herein, "PGM" means the traditional platinum group metals, i.e., Ru, Rh, Pd, OS, Ir, Pt, as well as other metals that are conventionally in similar catalytic applications, including Mo, W and precious metals such as Au and Ag. Preferred PGMs include Ru, Rh, Pd, OS, Ir, Pt, Pd, and Au, with Pt, Rh, and Pd being more preferred, and Pd and Pt being particularly preferred. In certain embodiments, the PGM comprises two or more metals, such as Pt and Pd; Pt, Pd, and Rh; Pd and Rh; Pd and Au; or single metals such as Pt, Pd, or Rh. For embodiments which utilize a combination of two or more metals, the ratio of each metal to the other is not particularly limited. In certain embodiments, the catalyst comprises a majority of Pt relative to other PGMs present in the catalyst, based on total weight of the PGMs. In certain, the catalyst comprises a majority of Pd relative to other PGMs present in the catalyst, based on total PGM weight. In certain embodiments which comprise Pt and Pd, the relative weight ratio of Pt:Pd is about 50:50 to about 90:10, for example about 50:40 to about 80:20, or about 60:40 to about 70:30.

In certain embodiments, the catalyst comprises 0.01 to about 10 weight percent PGM relative to the weight of the molecular sieve carrier. For example, the catalyst can comprise 0.05 to about 5 weight percent PGM, about 0.1 to about 1 weight percent PGM, about 0.2 to about 0.5 weight percent PGM, about 0.5 to about 1 weight percent PGM, or about 1 to about 3 weight percent PGM.

To achieve high selectivity for $N_2$ over $N_2O$, a majority of the PGM in the catalyst is preferably embedded within the molecular sieve crystals instead of disposed on the surface of the crystals. In certain embodiments, at least about 75 weight percent of the PGM is embedded in said porous network based on the total PGM in and on the molecular sieve material. For example, in certain embodiments, at least about 80 weight percent, at least about 90 weight percent, at least about 95 weight percent, or at least about 99 weight percent of the PGM is embedded in said porous network based on the total PGM in and on the molecular sieve material. In certain embodiments, substantially all of the PGM is embedded in the molecular sieve, and by corollary the surface of the crystals are substantially free of PGM. By substantially free of PGM, it is meant that the amount of PGM, if any, is de minimus and therefore does not affect the relevant catalytic properties of the material by a degree that can be detected by standard commercial techniques. In certain embodiments, the catalyst crystals are free of external PGM as measure by SEM imaging (i.e., spectral mapping).

Although it can be difficult to quantitatively measure the nature and quantity of PGMs embedded into the small pores of the invention, the relative amount of embedded PGM can be inferred through performance (e.g., $N_2$ selectivity). Typically, the selectivity for $N_2$ in standard small pore molecular sieves with surface PGMs at temperatures from 150 to 250° C. are well below 50%. In the present invention, the selectivity or performance of the PGM embedded catalyst is greater than 50%, preferably greater than about 60%, greater than about 70%, greater than about 80%, greater than about 90%, greater than about 95%, or greater than about 98% due to embedding PGMs within the pores as described herein.

In certain embodiments, the ratio of PGM embedded in the porous network of the molecular sieve relative to the PGM on the crystal surface is about 4:1 to about 99:1, for example about 10:1 to about 99:1, about 20:1 to about 99:1, or about 50:1 to about 99:1.

In certain embodiments, the PGM embedded in the porous structure is exchanged PGM and/or free PGM ions. In certain embodiments, a majority, or substantially all, of the PGM embedded in the porous structure is exchanged PGM on the interior surface walls. In certain embodiments, a majority, or substantially all, of the PGM embedded in the porous structure is free PGM ions in said void pore volumes.

In addition to PGM, the molecular sieve material can also comprise one or more transition metals, such as copper, nickel, zinc, iron, tungsten, molybdenum, cobalt, titanium, zirconium, manganese, chromium, vanadium, niobium, as well as tin, bismuth, and antimony. These additional metals are preferably present as extra-framework metals. Preferred transition metals are base metals, and preferred base metals include those selected from the group consisting of chromium, manganese, iron, cobalt, nickel, and copper, and combinations thereof. In a preferred embodiment, at least one of the extra-framework metals is copper. Other preferred extra-framework metals include iron, particularly in combination with copper.

Transition metals can be added to molecular sieves of the present invention by any conventional processes, including ion exchange, spray drying, incipient wetness, and the like. Preferably, the transition metal is present in an amount, and is added by a technique, that does not interfere with the concentration of the PGM in the molecular sieve. In certain embodiments, the transition metal is present in a concentration of about 0.1 to about 10 percent by weight, more preferably from about 0.5 to about 10 percent by weight, for example about 1 to about 5 percent by weight or about 2 to about 3 percent by weight, based on the weight of the molecular sieve.

The catalyst for use in the present invention can be in the form of a washcoat, preferably a washcoat that is suitable for coating a substrate, such as a metal or ceramic flow through monolith substrate or a filtering substrate, including for example a wall-flow filter or sintered metal or partial filter. Accordingly, another aspect of the invention is a washcoat comprising a catalyst component as described herein. In addition to the catalyst component, washcoat compositions can further comprise a binder selected from the group consisting of alumina, silica, (non-zeolite) silica-alumina, naturally occurring clays, $TiO_2$, $ZrO_2$, and $SnO_2$. Other washcoat additives include stabilizers and promoters. These additional components do not necessarily catalyze the desired reaction, but instead improve the catalytic material's effectiveness, for example by increasing its operating temperature range, increasing contact surface area of the catalyst, increasing adherence of the catalyst to a substrate, etc. Typical PGM loadings for washcoated SCR applications range from about 20 g/ft3 to about 300 g/ft3, more preferably about 50 g/ft3 to about 200 g/ft3, such as about 50 g/ft3 to about 100 g/ft3 or about 100 g/ft3 to about 150 g/ft3. The total amount of washcoated SCR catalyst component will depend on the particular application, but could comprise about 0.1 to about 15 $g/in^3$, about 1 to about 7 $g/in^3$, about 1 to about 5 $g/in^3$, about 2 to about 4 $g/in^3$, or about 3 to about 5 $g/in^3$ of the SCR catalyst. Preferred washcoat loading for the SCR catalyst is from about 0.1 to about 0.5 $g/in^3$ or about 0.3 to about 3.5 $g/in^3$.

In one embodiment, provided is an article comprising a substrate upon which the catalyst is deposited. The coating process may be carried out by methods known per se, including those disclosed in EP 1 064 094, which is incorporated herein by reference. Preferred substrates, particular for mobile applications, include wall-flow filters, such as wall-flow ceramic monoliths, and flow through substrates, such as metal or ceramic foam or fibrous filters. In addition to cordierite, silicon carbide, silicon nitride, ceramic, and metal, other materials that can be used for the substrate include aluminum nitride, silicon nitride, aluminum titanate, α-alumina, mullite e.g., acicular mullite, pollucite, a thermet such as $Al_2OsZFe$, $Al_2O3/Ni$ or $B_4CZFe$, or composites comprising segments of any two or more thereof. Preferred materials include cordierite, silicon carbide, and alumina titanate.

Preferred substrates for use in mobile application are monoliths having a so-called honeycomb geometry which comprises a plurality of adjacent, parallel channels, wherein each channel typically has a square cross-sectional area. The honeycomb shapes provide a large catalytic surface with minimal overall size and pressure drop. The actual shape and dimensions of the filter substrate, as well as properties such as channel wall thickness, porosity, etc., depend on the particular application of interest. In certain embodiments, the substrate has up to about 700 channels (cells) per square inch of cross section ("cpsi"), for example about 100 to about 400 cpsi or about 25 to about 300 cpsi.

Particular combinations of filter mean pore size, porosity, pore interconnectivity, and washcoat loading can be combined to achieve a desirable level of particulate filtration and catalytic activity at an acceptable backpressure. Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

Pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 5 to 50 µm, for example about 10 to about 40 µm, about 20 to about 30 µm, about 10 to about 25 µm, about 10 to about 20 µm, about 20 to about 25 µm, about 10 to about 15 µm, and about 15 to about 20 µm. In other embodiments, the mean pore size of the filter is about 10 to about 200 nm.

Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns. Preferred porosity for cordierite filters is from about 60 to about 75%.

In certain embodiment, the catalyst is formed into an extruded-type catalyst.

In certain embodiments, the catalyst is coated on a substrate in an amount sufficient to reduce the $NO_x$ and/or to oxidize ammonia contained in an exhaust gas stream flowing through the substrate or perform other functions such as conversion of CO into $CO_2$.

The catalyst described herein can promote the low temperature reaction of a reductant, preferably ammonia, with nitrogen oxides to selectively form elemental nitrogen ($N_2$) and water ($H_2O$) vis-à-vis the competing reaction of oxygen and ammonia and also oxidize ammonia with oxygen or reduce ammonia to $N_2$.

In certain embodiments, a conventional SCR catalyst and a PGM catalyst are used in series, for example on two separate substrates or on a single substrates as zones or layers. Preferably, the conventional SCR catalyst is disposed upstream of the PGM catalyst relative to the typical direction of exhaust gas flow past the catalysts. The conventional SCR catalyst preferably is a PGM-free catalyst. Examples of useful conventional SCR catalyst include those comprising a molecular sieve, such as BEA, CHA, ZSM-5, and the like, promoted with a transition metal, such as copper or iron, or comprising vanadium or vanadium/tungsten on a high surface area support such as alumina.

Turning to FIG. 1, shown is an embodiment of the invention comprising a substrate 10, such as a flow-through monolith, having an inlet 14 and an outlet 15 relative to the direction of exhaust gas flow 13 through the substrate. The inlet comprises a conventional SCR catalyst zone 14, while the substrate outlet comprises an PGM catalyst zone 15. As used herein, the term "zone" means a distinct catalytic area within and/or on the substrate. For example, a zone can be an area of the substrate in which a catalyst has permeated or a catalyst layer residing on top of and/or within substrate. The zone can be a discrete area, completely separated from other zones, can be adjacent to, or overlap with, other zones, or can be partially fused into other zones. The term "inlet" means the side, face, surface, channel, and/or portion of the substrate into which an exhaust gas typically flows from an external source. The term "outlet" means the side, face, surface, channel, and/or portion of the substrate from which an exhaust gas typically exits the filter. The phrase "on the inlet" and "on the outlet", with respect to the orientation of a catalytic zone and a substrate, is meant to include a catalyst residing as a zone or layer on top of the substrate face and/or within the substrate walls (i.e., within the pores of the substrate walls).

Figure 2:
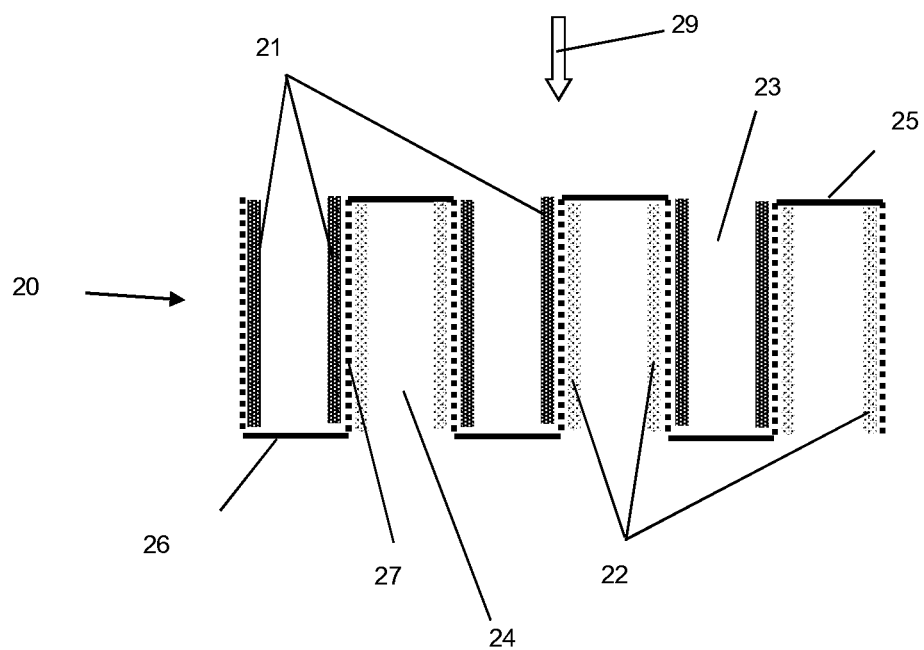
FIG. 2 is a diagram of a wall-flow filter according to an embodiment of the present invention, the filter having an inlet coated with a conventional SCR catalyst zone and an outlet coated with an PGM catalyst zone.

FIG. 2 shows a wall-flow filter 20 having inlet channels 23 and outlet channels 24 which are defined by a gas permeable walls 27 and gas impermeable inlet caps 25 and outlet caps 26. Exhaust gas having a direction of flow 29 enters the filter 20 via one or more of the inlet channels 23, passes through the gas permeable walls 27 which separate the inlet and outlet channels, and then exits the filter via the outlet channels 24. The exhaust gas entering the inlet channels typically comprises soot, $NO_x$, and preferably also contains a nitrogenous reducing agent, such as $NH_3$, which is used to convert the $NO_x$ into other gases via an SCR reaction. Prior to passing through the gas permeable wall, at least a portion of the particulate matter in the exhaust gas is trapped at the inlet where it contacts the conventional SCR zone 21. The conventional SCR zone facilitates a high-temperature SCR reaction, for example at about 250° C. to about 650° C. or about 300° C. to about 650° C. As the exhaust gas passes through the conventional SCR catalyst zone, at least a portion of the $NO_x$ reacts with $NH_3$ in the presence of the SCR catalyst, wherein the $NO_x$ is reduced to $N_2$ and other gases. As the gas passes through the filter wall, it contacts the PGM catalyst 22 which facilitates a low-temperature SCR reaction, for example at about 150° C. to about 300° C. or about 150° C. to about 250° C. and a high-temperature AMOX reaction, for example at 250° C. to about 650° C., about 300° C. to about 650° C., or about 350° C. to about 650° C.

In certain embodiments, the two zones converge between the inlet and outlet, while in other embodiments they are spatially separated. The zones on the inlet and outlet may exist as a coating on the surface of the filter substrate or may diffuse or permeate into all or a portion of the filter substrate. In a particularly preferred embodiment, the conventional SCR catalyst zone and the PGM catalyst zone permeate into opposite sides of the wall of a wall-flow filter. That is, the conventional SCR catalyst zone is created via the conventional SCR catalyst permeating into the wall from the inlet channel side of the wall and the PGM catalyst zone is created via the PGM catalyst permeating into the wall from the outlet channel side of the wall.

Figure 3:
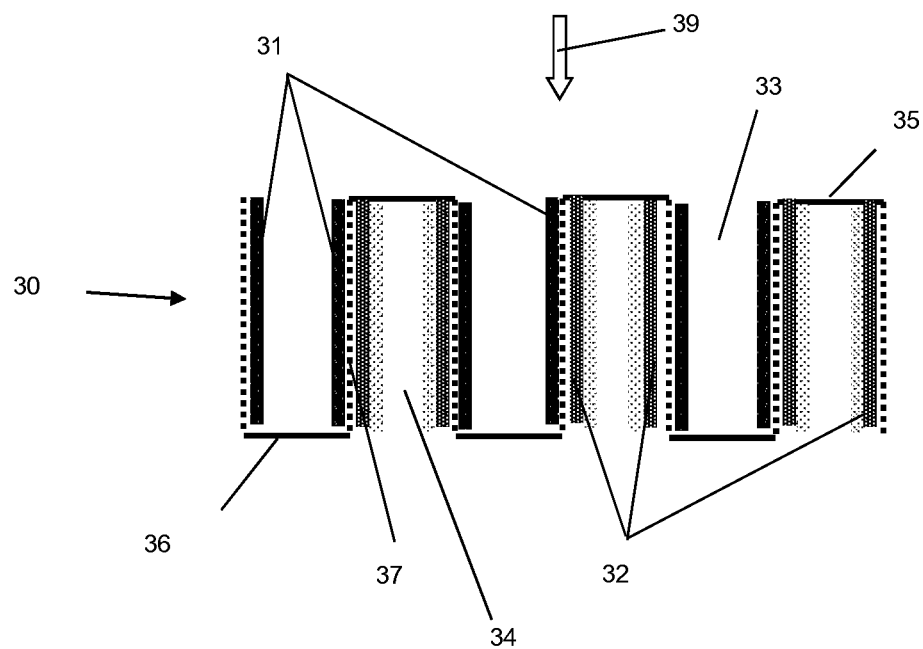
FIG. 3 is a diagram of a wall-flow filter according to an embodiment of the present invention, the filter having an inlet coated with a soot oxidation catalyst and an outlet coated with an conventional SCR catalyst and PGM catalyst in a layered arrangement.

Turning to FIG. 3, shown is a wall-flow filter 30 having inlet channels 33 and outlet channels 34 which are defined by a gas permeable walls 37 and gas impermeable inlet caps 35 and outlet caps 36. Exhaust gas having a direction of flow 39 enters the filter 30 via one or more of the inlet channels 33, passes through the gas permeable walls 37 which separate the inlet and outlet channels, and then exits the filter via the outlet channels 34. The exhaust gas entering the inlet channels typically comprises soot, $NO_x$, and preferably also contains a nitrogenous reducing agent, such as $NH_3$, which is used to convert the $NO_x$ into other gases via an SCR reaction. As the exhaust gas passes through the gas permeable wall, at least a portion of the particulate matter in the exhaust gas is trapped at the inlet where it contacts the soot oxidation zone 31. The soot oxidation zone facilitates an oxidation reaction wherein solid, carbonaceous particles of the soot are converted into gases, such as $CO_2$ and water vapor, which then pass through the gas permeable filter wall.

On the outlet side of the filter wall is a layered catalyst arrangement comprising a conventional SCR catalyst and a PGM catalyst according to the present invention, wherein the conventional SCR catalyst is disposed as a layer between the filter wall and the PGM catalyst is disposed as a layer on top of the SCR catalyst layer so that the exhaust gas flowing through the filter contacts the conventional SCR catalyst layer prior to the PGM catalyst layer. As the exhaust gas passes through the layered catalyst 32, at least a portion of the $NO_x$ is reduced to $N_2$ and other gases over a wide temperature range (e.g., 150 to 650° C.) and ammonia slipping past the conventional SCR catalyst layer is oxidized by the PGM catalyst at temperatures greater than about 250° C.

According to another aspect of the invention, provided is a method for reducing $NO_x$ compounds and/or oxidizing $NH_3$ in an exhaust gas, which comprises contacting the gas with a catalyst composition described herein for a time sufficient to reduce the level of $NH_3$ and/or $NO_x$ compounds in the gas. In one embodiment, nitrogen oxides are reduced with the reducing agent at a temperature of at least about 150° C. In another embodiment, the nitrogen oxides are reduced with the reducing agent at a temperature from about 150° C. to about 650° C. In a particular embodiment, the temperature range for an SCR reaction is from about 150 to about 300° C. In a temperature range of about 150 to about 300° C., and particularly between about 150° C. and about 250° C., the selectivity for $N_2$ in the SCR reaction is at least about 50%, for example at least about 75%, at least about 90%, at least about 95%, or about 100%. In the same temperature ranges, the conversion of $NO_x$ to $N_2$ and $H_2O$ using the small pore molecular sieve catalyst embedded with PGM as described herein is at least about 50%, at least about 75%, at least about 85%, at least about 90%, or at least about 95%, particularly under conventional test conditions for commercial development of a diesel engine catalyst, including for example at a gas hourly space velocity of from about 5,000 $hr^{-1}$ to about 500,000 $hr^{-1}$, optionally from about 10,000 $hr^{-1}$ to about 200,000 $hr^{-1}$. In certain embodiments, the small pore molecular sieve catalyst embedded with PGM as described herein has higher or substantially similar (i.e., within 10%) NOx conversion compared to an aluminosilicate chabazite catalyst having an SAR of 30 and containing 2.4 weight percent exchanged copper under similar test conditions.

Methods of the present invention may comprise one or more of the following steps: (a) accumulating and/or combusting soot that is in contact with the inlet of a catalytic filter; (b) introducing a nitrogenous reducing agent into the exhaust gas stream prior to contact with wall-flow filter containing a PGM embedded small pore catalyst described herein; (c) generating $NH_3$ over a $NO_x$ adsorber catalyst, and preferably using such $NH_3$ as a reductant in a downstream SCR reaction; (d) contacting the exhaust gas stream with a Diesel Oxidation Catalyst (DOC) to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an ASC catalyst, preferably downstream of a conventional SCR catalyst to oxidize most, if not all, of the ammonia prior to emitting the exhaust gas into the atmosphere or passing the exhaust gas through a recirculation loop prior to exhaust gas entering/re-entering the engine.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2)_2CO$), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

In another embodiment, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of an SCR catalyst. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$. In certain embodiments, the NAC comprises a PGM catalyst as disclosed herein.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a PGM catalyst described herein. The system can include a controller for the metering the nitrogenous reductant into the flowing exhaust gas only when it is determined that the PGM catalyst is capable of catalyzing $NO_x$ reduction at or above a desired efficiency, such as at above 150° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$. The control means can comprise a pre-programmed processor such as an electronic control unit (ECU).

In a further embodiment, the PGM embedded small pore molecular sieve is provided as oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR catalyst having a ratio of NO to $NO_2$ of from about 4:1 to about 1:3 by volume, e.g. at an exhaust gas temperature at oxidation catalyst inlet of 250° C. to 450° C. The oxidation catalyst is preferable coated on a flow-through monolith substrate. In one embodiment, the at least one platinum group metal is platinum, palladium or a combination of both platinum and palladium. The PGM catalyst can further be used to oxidize other components of an exhaust gas, including conversion of carbon monoxide into carbon dioxide.

In another embodiment, the PGM catalyst of the present invention can be used in a three-way-catalyst (TWC) in gasoline or other rich burn engines.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

Example 1

Preparation of PGM Embedded Small Pore Zeolite (RHO)

A first solution was prepared by mixing 3.06 g of sodium hydroxide and 12.38 g of $H_2O$ into a 45 ml PTFE cup designed to fit into an acid digestion vessel (Parr Instrument Company). 2.79 g of aluminum hydroxide were added to the first solution. The resulting mixture was stirred until a homogeneous solution was obtained. 2.56 g of cesium hydroxide solution (50 wt. %) were added to the resulting mixture. Then, 0.134 g of bis(enthylenediamine)platinum (II) chloride were added once the cesium hydroxide solution was incorporated. The mixture was stirred until homogeneous and 14.72 g of AS-40 Ludox were slowly added and blended into the mixture. The mixture was heated at 100° C. for 1 day. The solids were recovered by filtration. The composition of the recovered material is provided below:

| $SiO_2/Al_2O_3$ | $(Na_2O + Cs_2O)/SiO_2$ | $H_2O/SiO_2$ | $Cs_2O/(Na_2O + Cs_2O)$ | $Pt/SiO_2$ |
|---|---|---|---|---|
| 7.8 | 0.43 | 13.6 | 0.09 | 0.0035 |

The synthesized Pt-RHO contain 0.17 wt. % Pd and XRD analysis confirmed that the zeolite comprised an RHO framework. SEM imaging demonstrated that no external Pt by spectral mapping, though Cs was present on the crystal surfaces.

Prophetic Example 2

Preparation of PGM Embedded Small Pore Zeolite (CHA)

A source of alumina and a base will be combined and dissolved in water. Then platinum nitrate will be added followed by the addition of tetraethylenepentamine (TEPA). The mixture will be stirred for about an hour and then a source of silica (e.g. silica sol) will be added drop-wise while stirring continues. The resulting gel will be stirred for another three hours and then will be transferred to a Teflon-lined stainless steel autoclave where it will be heated at 140° C. for about 4 days. The product will be recovered, filtered, washed, and then dried at 80° C. for about 24 hours. The resulting product will be tested via SEM to confirm that platinum is embedded in the CHA framework.

This procedure will be repeated except that the platinum nitrate will be substituted for palladium nitrate and the resulting product will be tested via SEM to confirm that palladium is embedded in the CHA framework.

Prophetic Example 3

Catalytic Performance ($N_2$ Selectivity/$NO_x$ Conversion/$NH_3$ Oxidation)

The PGM embedded molecular sieves powders produced in examples 1 and 2 above will be tested for $N_2$ Selectivity/$NO_x$ Conversion/$NH_3$ Oxidation. A portion of each of the powder samples will be hydrothermally aged at 500° C. for 2 hours and another portion of the powder sample will be hydrothermally aged at 800° C. for 16 hours. Samples of the fresh powders and the aged powders will be exposed to a simulated diesel engine exhaust gas that will be combined with ammonia to produce a stream having an ammonia to $NO_x$ ratio (ANR) of 1 and a space velocity of 50,000 per hour. The catalyst's capacity for $NO_x$ conversion will be determined at temperatures ranging from about 150° C. to about 300° C. The catalyst capacity for NH3 conversion will be determined at temperatures ranging from about 250° C. to about 550° C.

The results will show that the PGM catalyst have higher or substantially similar (i.e., within 10%) $N_2$ Selectivity, $NO_x$ Conversion, and/or $NH_3$ Oxidation compared to an aluminosilicate chabazite catalyst having an SAR of 30 and containing 2.4 weight percent exchanged copper under similar test conditions.

The invention claimed is:

1. A catalyst comprising:
   a. a small pore aluminosilicate molecular sieve material comprising a plurality of crystals having a surface and a porous network, wherein the small pore molecular sieve material comprises a plurality of crystals having a mean crystalline size of about 0.01 to about 10 microns, wherein said aluminosilicate molecular sieve has a framework is selected from CHA, RHO, LEV, AEI, ANA, LTA, DDR, PAU, UEI, and SOD, has a silica-to-alumina ratio of about 8 to about 150 and an alkali content of no more than about 5 weight percent based on the total weight of the aluminosilicate molecular sieve; and
   b. at least one Platinum Group Metal (PGM),
   wherein a majority amount of said PGM is embedded in said porous network relative to PGM disposed on said surface.

2. The catalyst of claim 1, wherein said catalyst comprises about 0.01 to about 10 weight percent PGM relative to weight of the molecular sieve.

3. The catalyst of claim 1, wherein said catalyst comprises about 0.1 to about 1 weight percent PGM relative to weight of the molecular sieve.

4. The catalyst of claim 1, wherein the small pore molecular sieve material comprises a plurality of crystals having a mean crystalline size of about 0.5 to about 5 microns.

5. The catalyst of claim 1, wherein said PGM is selected from platinum, palladium, and rhodium.

6. The catalyst of claim 1, wherein at least about 75 percent of said PGM is embedded within said porous network based on the total PGM in the molecular sieve.

7. The catalyst of claim 1, wherein at least about 90 percent of said PGM is embedded within said porous network based on the total PGM in the molecular sieve.

8. The catalyst of claim 1, wherein ratio of PGM embedded in the porous network relative to PGM on the surface is about 4:1 to about 99:1.

9. The catalyst of claim 1, wherein said surface is substantially free of said PGM.

10. The catalyst of claim 1, wherein a majority of PGM is dispersed throughout said molecular sieve.

11. The catalyst of claim 1, wherein said PGM embedded in said porous structure is exchanged PGM or free PGM ions.

12. The catalyst of claim 1, wherein said porous network comprises interior surface walls and wherein a majority of said PGM embedded in said porous structure is exchanged PGM on said interior surface walls.

13. The catalyst of claim 1, wherein said porous network comprises void pore volumes and wherein a majority of said PGM embedded in said porous structure is free PGM ions in said void pore volumes.

14. A catalyst article comprising the catalyst of claim 1 disposed on a substrate.

15. The catalyst article of claim 14, wherein said substrate is a honeycomb monolith.

16. The catalyst article of claim 14, wherein said substrate is a wall-flow filter.

17. The catalyst article of claim 14, wherein said substrate is a flow-through monolith.

18. A method for treating emissions comprising:
   a. contacting a lean burn exhaust stream containing $NO_x$ and ammonia with a catalyst at a temperature of about 150° C. to about 650° C.; and
   b. reducing at least a portion of said $NO_x$ to $N_2$ and $H_2O$ at a temperature of about 150° C. to about 250° C. and oxidizing at least a portion of said ammonia at a temperature of about 300° C. to about 650° C.;
   wherein the catalyst comprises a small pore aluminosilicate molecular sieve material comprising a plurality of crystals having a surface and a porous network; and at least one Platinum Group Metal (PGM), wherein a majority amount of said PGM is embedded in said porous network relative to PGM disposed on said surface.

19. The method of claim 18, wherein said reducing has a selectivity for $N_2$ of at least about 90% at a temperature of about 150° C. to about 250° C.

20. The method of claim 18, wherein said reducing has a $N_2O$ selectivity of less than about 10% at a temperature of about 150° C. to about 650° C.

21. The method of claim 18, wherein said oxidizing has a conversion of at least about 95% at a temperature of about 350° C. to about 650° C.

22. A method for treating emissions comprising:
   a. contacting a lean burn exhaust stream containing CO and NO with a catalyst comprising a small pore aluminosilicate molecular sieve material comprising a plurality of crystals having a surface and a porous network; and at least one Platinum Group Metal (PGM), wherein a majority amount of said PGM is embedded in said porous network relative to PGM disposed on said surface;
   b. oxidizing at least one of said CO and NO to form $CO_2$ and $NO_2$, respectively, wherein said oxidizing NO to $NO_2$ results in an exhaust gas stream having an $NO:NO_2$ ratio of from about 4:1 to about 1:3 by volume.

23. A system for treating exhaust gas comprising:
   a. a reductant source;
   b. an upstream SCR catalyst; and
   c. a downstream catalyst comprising a small pore aluminosilicate molecular sieve material comprising a plurality of crystals having a surface and a porous network; and at least one Platinum Group Metal (PGM), wherein a majority amount of said PGM is embedded in said porous network relative to PGM disposed on said surface;
   wherein said reductant source, upstream SCR catalyst, and downstream catalyst are in fluid communication with each other and are arranged so that an exhaust gas stream flowing through the system contacts the reductant source prior to the upstream SCR catalyst and contacts the SCR catalyst prior to the downstream SCR catalyst.

24. The system of claim 23, wherein said reductant source is a $NO_x$ absorber catalyst.

25. The system of claim 23, wherein said upstream SCR catalyst has a $NO_x$ conversion efficiency greater than that of said downstream catalyst at a temperature of about 350° C. to about 650° C. and said downstream catalyst has a $NO_x$ conversion efficiency greater than that of said upstream SCR catalyst at a temperature of about 150° C. to about 250° C.

26. The system of claim 23, wherein said downstream catalyst selectively reduces NOx when contacting said exhaust gas stream at a temperature of about 150° C. to about 250° C. and oxidizes the nitrogenous reductant when contacting said exhaust gas stream at a temperature of about 350° C. to about 650° C.

* * * * *